UNITED STATES PATENT OFFICE.

MAX WALLERSTEIN, OF NEW YORK, N. Y.

METHOD OF PREPARING BREWING-WATERS.

No. 879,843.     Specification of Letters Patent.     Patented Feb. 18, 1908.

Application filed June 21, 1907. Serial No. 380,159.

*To all whom it may concern:*

Be it known that I, MAX WALLERSTEIN, a citizen of the United States, residing at 105 East Ninety-first street, New York city, in the county of New York and State of New York, have invented certain new and useful Improvements in Methods of Preparing Brewing-Waters, of which the following is a specification.

This invention relates to the preparation of solutions adapted for the preparation of beverages. The invention will be described as applied to the preparation of brewing waters, but it is also adapted for use in connection with non-fermented beverages, and particularly carbonated beverages, as soda waters, ginger ale, carbonated mineral waters and the like.

It is well known that the waters of certain districts are adapted for the production of ales and beers having peculiar and characteristic qualities; thus the waters of Burton-on-Trent have long been renowned for yielding excellent pale ales, and the waters at Munich produce excellent beers. In other districts waters are found which are admirably adapted for the production of special and characteristic products. Upon investigation it has been found that the chemical composition of these waters bears a constant relation to their behavior in brewing operations. For instance the Burton waters are found to contain relatively large proportions of calcium sulfate, and their excellence for the production of that particular class of ales for which the district is famed is largely attributable to the presence of this salt.

Attempts have been made to reproduce the peculiar effects of the Burton and other waters by adding to other natural waters the indicated ingredients required to imitate their chemical composition, but such efforts have been invariably unsatisfactory. Thus efforts have been made to imitate the Burton ales by the addition to water used in brewing of definite proportions of plaster of paris; the product, however, has been found to be very impure and to be extremely variable in character so that even if uniform quantities of plaster of paris were added, varying amounts of calcium sulfate would go into solution. Furthermore mechanical difficulties arise owing to the high density and slow rate of solution of the plaster of paris, the result being that the compound, whether added in the cold or hot water tank, settles quickly to the bottom and leaves an undissolved residue which is highly prejudicial in subsequent operations. Its use therefore involves special apparatus and serious interference with the brewing operation, and for these reasons has not met with favor. It has also been proposed to add to the water used for brewing, pure calcium sulfate, but by reason of the interference of this salt, in its commercial form, with the subsequent operations, by reason of its slow rate of solution, its use has not met with favor.

I have discovered that ales and beers of peculiar excellence may be produced by adding to the water to be employed in their preparation definite proportions of calcium sulfate prepared in the manner hereinafter described, or of mixtures of mineral salts containing calcium sulfate so prepared.

When calcium sulfate is precipitated from aqueous solutions by the usual methods, as for instance by mixing a sufficiently concentrated solution of a calcium salt, as calcium chlorid, with a soluble normal or acid sulfate or with sulfuric acid, the calcium sulfate separates as an extremely finely-divided precipitate which appears under the microscope in the form of minute needle-like crystals. I have discovered however that by effecting the precipitation in the presence of small proportions of a colloidal substance capable of serving as a restraining or retarding agent the precipitate separates much more slowly and differs in character from the needle-like crystals above mentioned, appearing under the microscope in the form of plates or tablet-like crystals of relatively large size. These crystals are found to separate very readily from the mother-liquor under the ordinary conditions of filter-pressing, and to be easily washed and dried: They are found also to possess a high solution rate, the above characteristics rendering them particularly suitable for certain purposes, as for the preparation of brewing waters.

I may proceed substantially as follows: To a solution of a suitable calcium salt, as calcium chlorid, which may be of any desired strength but is preferably quite concentrated, say ten to twenty per cent. I add a suitable colloidal substance, as gelatin, from one to five ounces of gelatin being preferably added to each thirty gallons of the solution, the proportion increasing with the concentration of the chlorid solution.

There is then mixed with the chlorid solution in the proportion required to combine with the calcium therein, a solution of a suitable sulfate, as the normal or acid sulfate of sodium, or sulfuric acid, and the mixture is permitted to stand until precipitation is complete, the precipitation being aided by heating if desired. In some cases I prefer to add the gelatin or equivalent colloidal substance both to the solution of the calcium salt and to that of the sulfate. In either case the calcium sulfate will be found to separate in the plate-like crystals above referred to, subsiding quickly in the solution and readily separable therefrom.

Instead of gelatin I may employ other albuminoid substances, possessing like gelatine the property of retarding the crystallization and determining the separation of the calcium sulfate in the form above described.

Together with calcium sulfate prepared as above described I prefer to use, more particularly in the preparation of brewing waters, appropriate quantities of the chlorids of calcium, magnesium, potassium and sodium or equivalent mineral salts. The quantity of each ingredient, and the relative proportion of each, will vary according to the character of the water to be treated and of the product to be manufactured. A specific example of the proportions of the various ingredients suitable for brewing waters is as follows: 65 parts of calcium sulfate prepared as above described; 15 parts of calcium chlorid; 5 parts of magnesium chlorid; 10 parts of sodium chlorid; and 10 parts of potassium chlorid. For the majority of natural waters one pound of the above mixture may be added to two hundred to three hundred gallons of the water. The ingredients accompanying the calcium sulfate serve to accelerate its solution, to increase its total solubility, and also in the case of fermented beverages, to exert a favorable influence on the fermentation. In all cases the beverage is found to be exceptionally bright, clear and palatable, and to retain these properties for indefinite periods.

The method of preparing calcium sulfate in plate-like crystals as herein described is claimed in my copending application, Ser. No. 380,160, filed June 21, 1907.

I claim:

1. The method of treating water for the preparation of beverages which consists in precipitating calcium sulfate in presence of a colloidal retarding agent, and dissolving the precipitate in water in the required proportion.

2. The method of treating water for the preparation of beverages which consists in precipitating calcium sulfate in presence of a colloidal retarding agent, separating the precipitate, mixing therewith salts capable of accelerating its solution and modifying its action, and dissolving the mixture in water in the required proportion.

3. The method of treating water for the preparation of beverages which consists in precipitating calcium sulfate in presence of a colloidal retarding agent, separating the precipitate, mixing therewith chlorids of alkali or alkali earth metals, and dissolving the mixture in water in the required proportion.

In testimony whereof, I affix my signature in presence of two witnesses.

MAX WALLERSTEIN.

Witnesses:
CLINTON P. TOWNSEND,
CHARLES H. POTTER